(No Model.)
R. F. HAMILTON & J. WODISKA.
BICYCLE PEDAL.
No. 575,712.   Patented Jan. 26, 1897.
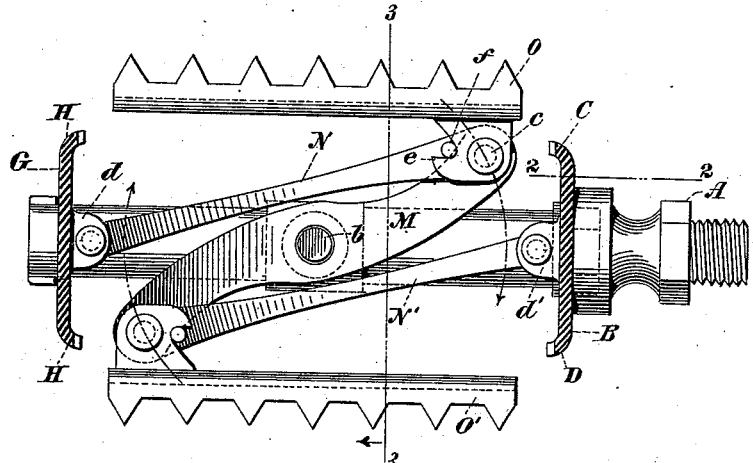
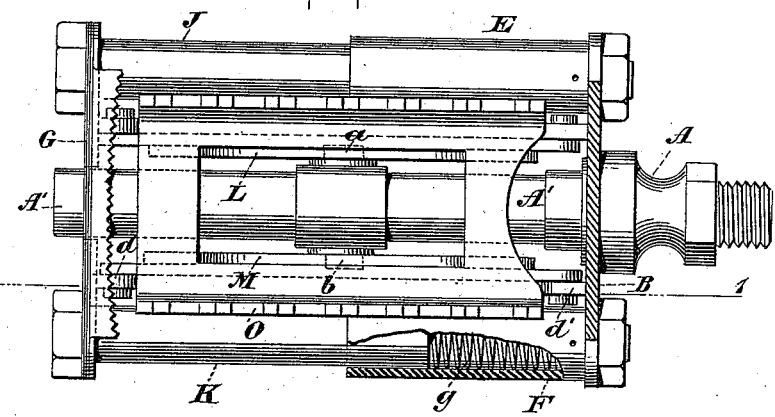
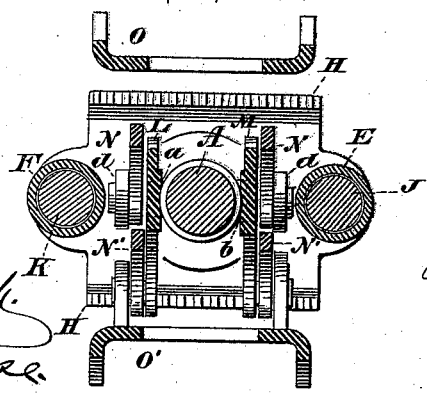
WITNESSES:
Gustave Dieterich
George Morse
INVENTORS
Richard F. Hamilton
Julius Wodiska
BY Briesen & Knauth
ATTORNEYS.

United States Patent Office.

RICHARD F. HAMILTON AND JULIUS WODISKA, OF NEW YORK, N. Y.

BICYCLE-PEDAL.

SPECIFICATION forming part of Letters Patent No. 575,712, dated January 26, 1897.

Application filed February 10, 1896. Serial No. 578,635. (No model.)

*To all whom it may concern:*

Be it known that we, RICHARD F. HAMILTON and JULIUS WODISKA, residents of the city, county, and State of New York, have invented certain new and useful Improvements in Bicycle-Pedals, of which the following is a specification.

Our invention relates to bicycle-pedals of the clamping variety, and has for its object to produce a simple and reliable clamping-pedal.

To this end our invention consists in the construction hereinafter set forth and claimed.

Our invention will be understood by referring to the accompanying drawings, in which—

Figure 1 is a sectional side elevation of a pedal embodying our invention, the section being taken on line 1 1 of Fig. 2. Fig. 2 is a broken-away sectional plan view thereof, the section being taken on line 2 2 of Fig. 1. Fig. 3 is a transverse sectional view of the same on line 3 3 of Fig. 1.

In the drawings, A is a pedal post or stem. On this stem a rotary stem A' is journaled, a cross-head or side plate B being movably carried on this stem and provided with foot-clamps C D, and has extending therefrom tubular guides E F. Opposite to the cross-head B is a cross-head or side plate G, which carries foot-clamps H H and guides J K, which enter the tubular guides E F, respectively, and is apertured for the free passage of the rotary stem A'. The rotary stem A' carries pivots *a b*, upon which operating-levers L M are centrally pivoted. Adjacent ends of the two operating-levers, as, for instance, the upper ends, as shown in Fig. 1, are connected by links N with the cross-head G, each of the links being pivoted at one end to an operating-lever, as indicated at *c*, and pivoted at the other end in the ear *d*, carried by the cross-head. A similar set of connections obtains on the lower side of the pedal, that is to say, the cross-head B is provided with an ear or ears *d'*, to which a link or links N' are pivoted, which link or links are pivoted to the lower ends of the operating-levers. It will be understood, however, that the words "upper" and "lower" are used here with respect to the drawings, the pedal itself being rotatable, the stem A' turning on the stem A.

Pivoted at the outer ends of the links are treads O O', which are preferably of the rat-trap form shown and are provided with lugs *e*, which engage with stop-pins *f* on the links to prevent the treads from swinging too far outward and to maintain them in a horizontal position. It will be observed that these treads are in the present instance end-pivoted, that is to say, they are pivoted away from their central lines—to wit, at or near one of their ends. These treads accompany the foot in all its movements, following the direction of pressure.

By referring to Fig. 2 it will be noted that a restoring-spring *g* is contained within each of the tubular guides E and F and interposed between the bottom of the tube and the guides J and K and tend to maintain the parts in the position shown in Fig. 1.

The operation of our device is as follows: Pressure upon either tread will cause the operating-lever to swing and pull upon its links, thereby causing the guides J E K F to telescope and bringing the foot-clamps toward each other into close contact with the sides of the shoe-sole, thus firmly clamping the sole. As soon as the pressure upon the tread is released the restoring-springs will serve to restore the parts to their original position, which is shown in Fig. 1.

We are aware that it is not broadly new to provide bicycle-pedals with foot-clamps, and therefore we do not mean to claim such a structure broadly; but What we do claim, and desire to secure by Letters Patent, is—

1. A bicycle-pedal comprising side plates one at least of which is capable of sliding bodily in a transverse direction, foot-clamps on said side plates and movable foot-sustaining treads, and connections between the treads and one or more of the side plates to communicate movement from the treads to one or more of the side plates to clamp the foot in place.

2. A pedal comprising side plates one at least of which is capable of sliding bodily in a transverse direction, foot-clamps forming part of each of said side plates, movable foot-sustaining treads and an operating-lever intervening between the treads and the side plates to operate one or more of said side plates to clamp the sole of the shoe.

3. A pedal, comprising movable foot-clamps, telescoping guides connected with said foot-clamps, a movable tread and connections between the tread and foot-clamps, whereby a movement of the tread will cause a corresponding movement of the foot-clamps.

4. A pedal comprising the following instrumentalities in operative relation, namely: a pedal-stem, foot-clamps, a centrally-pivoted operating-lever, a plurality of treads and links intervening between the foot-clamps and treads, substantially as described.

5. A pedal comprising movable treads, side plates having foot-clamps thereon, telescoping guides between said side plates, centrally-pivoted operating-levers connecting said treads and links intervening between the treads and the side plates.

RICHARD F. HAMILTON.
JULIUS WODISKA.

Witnesses:
CHAS. E. SMITH,
MAURICE BLOCK.